United States Patent
Gao et al.

(10) Patent No.: US 7,764,687 B1
(45) Date of Patent: Jul. 27, 2010

(54) LONGEST PREFIX MATCH SEARCH TECHNIQUE

(75) Inventors: Biao Gao, Santa Rosa, CA (US); Yibin Yang, Santa Rosa, CA (US); Charles Chen, Santa Rosa, CA (US)

(73) Assignee: Meriton Networks US Inc., Wilmington, DE (US)

( * ) Notice: Subject to any disclaimer, the term of this patent is extended or adjusted under 35 U.S.C. 154(b) by 1371 days.

(21) Appl. No.: 10/401,904

(22) Filed: Mar. 28, 2003

Related U.S. Application Data

(60) Provisional application No. 60/368,827, filed on Mar. 28, 2002.

(51) Int. Cl.
*H04L 12/56* (2006.01)
(52) U.S. Cl. .................. 370/392; 370/389; 370/395.31
(58) Field of Classification Search .................. 370/351, 370/352, 389, 392, 395.31, 408, 471, 474
See application file for complete search history.

(56) References Cited

U.S. PATENT DOCUMENTS

| | | | | |
|---|---|---|---|---|
| 6,061,712 | A * | 5/2000 | Tzeng | 709/202 |
| 6,560,610 | B1 * | 5/2003 | Eatherton et al. | 707/104.1 |
| 6,564,211 | B1 * | 5/2003 | Andreev et al. | 707/3 |
| 6,691,171 | B1 * | 2/2004 | Liao | 709/245 |
| 6,691,218 | B2 * | 2/2004 | Brown | 711/216 |
| 2004/0236720 | A1 * | 11/2004 | Basso et al. | 707/1 |

OTHER PUBLICATIONS

Henry Tzeng, "On Fast Address-Lookup Algorithms", IEEE Journal on Selected Areas in Communication, vol. 17, No. 6, Jun. 1996, pp. 1067-1082.
Waldvogel et al., "Scalable High Speed IP Routing Lookups", Proceedings of ACM SIGCOMM '97 Conference, vol. 27 pp. 25-35, Sep. 1997.
Keith Sklower, "A Tree Based Routing Table for Berkeley UNIX", Technical Report, Univ. of California, Berkeley, 1993, 14 pages.
Henry Tzeng, "Longest Prefix Search Using Compressed Trees", Proceedings IEEE Global Communications '98 Conference, 6 pages.

* cited by examiner

*Primary Examiner*—Kwang B Yao
*Assistant Examiner*—Nguyen Ngo
(74) *Attorney, Agent, or Firm*—Mayer & Williams PC; Stuart H. Mayer

(57) ABSTRACT

A router identifies in a data packet an address of a network device. An algorithm determines that the address and a first prefix in a tree data structure match up to a first mask length of the first prefix. The algorithm maintains the first prefix in a temporary storage location if there is a match, and determines whether the address and a second prefix in the tree data structure match up to a second mask length of the second prefix, wherein an external node of the second prefix is linked below an external node of the first prefix, and wherein the second mask length is longer than the first mask length. The algorithm maintains the second prefix as a better match of the address, if the address and the second prefix match up to the mask length of the second prefix.

13 Claims, 10 Drawing Sheets

LONGEST PREFIX MATCH SEARCH TECHNIQUE

RELATED APPLICATION DATA

This application claims priority based on U.S. Provisional Application 60/368,827, filed Mar. 28, 2002 by Gao et al.

TECHNICAL FIELD OF THE INVENTION

Embodiments of the invention are generally related to the field of data networking and, in particular, to a longest prefix match search technique.

BACKGROUND OF THE INVENTION

A network is a group of two or more computer systems linked by wired or wireless connections. Data, commonly referred to as a packet, is transmitted from a source computer system at which the packet originates, to a destination computer system. Examples of sources and destinations include a desktop computer, a personal digital assistant, or a mobile or laptop computer. The computer systems in a network are commonly referred to as nodes.

A packet typically travels through intermediate computer systems during transmission. An example of an intermediate computer system is a switch or a router. In general, a router is a packet-forwarding device that receives a packet and determines a next node to which to forward the packet as it proceeds to its destination. In order to determine the next node, the router examines the packet's destination address, accesses the router's routing table, which includes routing table entries, and searches for a routing table entry (RTE) having a destination address that matches the packet's destination address. An RTE typically includes at least a destination, identified by a destination address; a mask length (discussed later, along with masks); a next node to which to forward the packet along the route to the destination; and some additional information.

An internetwork, e.g., the Internet, is the interconnection of many individual networks. The internet protocol (IP) is a protocol for routing packets on an internetwork, providing the set of rules for networks to communicate with each other. An IP address may identify a node, such as the packet's destination, a destination in a RTE, and/or a next node. An IP address typically includes decimal numbers are separated by periods. Each decimal number is commonly referred to as an octet. Each octet may be represented as a string of eight binary digits. For example, the IP address 148.225.3.61 includes four octets, and in binary form is 10010100.11100001.00000011.00111101. An octet is not limited to being represented as binary digits, e.g., an octet may be represented by two hexadecimal digits.

An IP address typically has two parts: a network number, which identifies the overall network of which a node is a part, and a node number, which identifies a specific node within the network. For example, in the destination address 148.225.3.61, the network number may be 148.225, and the node number 3.61. In IP version 4 (IPv4), an IP address includes four octets and is 32 bits in length, while in IP version 6 (IPv6), an IP address includes 16 octets and is 128 bits in length. See, e.g., Internet Engineering Task Force (IETF) Request for Comments (RFC) 1812, "Requirements for IP Version 4 Routers," June 1995; IETF RFC 2460, "Internet Protocol, Version 6 (IPv6) Specification," December 1998. There may be more than one RTE address that matches the packet's destination address, because one RTE may have the same network number as the destination address, while another entry may have the same network number and node number. In that case, the router typically selects, for determining the next node, the more specific RTE address that matches the destination address.

A mask is essentially a screen that indicates the bit positions in an address to examine. In a binary mask, a "1" in a bit position indicates that a bit occupying that bit position is a relevant bit, i.e., a bit to be examined, while a "0" indicates that the bit occupying that bit position is not a relevant bit, i.e., a bit not to be examined. In another type of mask, a hexadecimal mask, an "f" represents four relevant bits to examine, and a 0 indicates four irrelevant bits that are not to be examined. When a mask is applied to an address, a new address is generated based on the bits that are not relevant, that is, the relevant bits in the address remain unchanged, but the bits in the address that are not relevant are changed to 0s.

For example, a RTE may have a mask length of 16, represented by the mask 255.255.0.0 (11111111.11111111.00000000.00000000). The string of all 1s is an indication to examine, e.g., the network number, and the 0s indicate not to examine, e.g., the node number, possibly because the router is searching for another network to which to forward the packet (when the packet arrives at the other network, another router in that network may look at the whole address to determine the destination to which to forward the packet). A mask length reduces the need to examine a whole address, which allows for faster packet forwarding.

The combination of a destination address and a mask length is commonly referred to as a prefix. The prefix identifies the number of relevant bits used to identify a network. For example, 192.9.205.22/18 means the first 18 bits identify the network and the remaining 14 bits are used to identify hosts in the network. A prefix may be used to represent a RTE. A prefix that best matches a packet's destination address is commonly referred to as a longest prefix match, because such a prefix typically has more relevant bits that match the destination address, and thus a longer mask length, than a prefix whose address matches fewer relevant bits of the destination address. A search for a longest prefix match is commonly referred to as a longest prefix match search.

Longest prefix-match searching fits naturally into current destination address formatting (i.e., groups of decimal numbers separated by periods, where each decimal number represents a string of binary digits) and the destination-based hop-by-hop packet-forwarding paradigm. A routing table may be structured to facilitate longest prefix match searching. An example of a routing table structure that facilitates longest prefix match searching is a Patricia Tree, and the corresponding Patricia Tree algorithm is a technique used to determine a longest prefix match.

Generally, a traditional Patricia Tree consists of internal nodes and external nodes linked with one another. A node linked below another node is referred to as a child node of the node to which it is linked, while a node linked above another node is referred to as a parent node of the node to which it is linked. An external node typically identifies a prefix representing an RTE. An internal node specifies a bit position to examine, in order to determine the value of a bit occupying that bit position. The value of the bit determines the next node to which to proceed in the Patricia Tree, e.g., proceed to a left child node if the bit is a 0, or to a right child node if it is a 1. In a traditional Patricia Tree, an external node is a leaf node, meaning it has no child nodes, while an internal node is a non-leaf node, meaning it has at least one child node.

In a traditional Patricia Tree algorithm, a determination as to whether a prefix's address matches a packet's destination address occurs at an external node. This results in a disadvantage, commonly referred to as backtracking, of the Patricia Tree algorithm. Specifically, because a determination as to whether there is a match occurs at an external node, the algorithm backtracks up the Patricia Tree if there is no match, since the external nodes are leaf nodes. The algorithm applies a mask, thus changing irrelevant bits to 0s and altering the search if a bit that was changed to 0 occupies a bit position identified by an internal node, and repeats the search. When a router backtracks and repeats a search, routing table look-up speed is reduced, which slows router performance.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION OF THE INVENTION

A longest prefix match search technique is described. In the following description, for purposes of explanation, numerous specific details are set forth. It will be apparent, however, to one skilled in the art that embodiments of the invention can be practiced without these specific details. In other instances, structures and devices are shown in block diagram form in order to avoid obscuring the understanding of this description.

Figure 1:
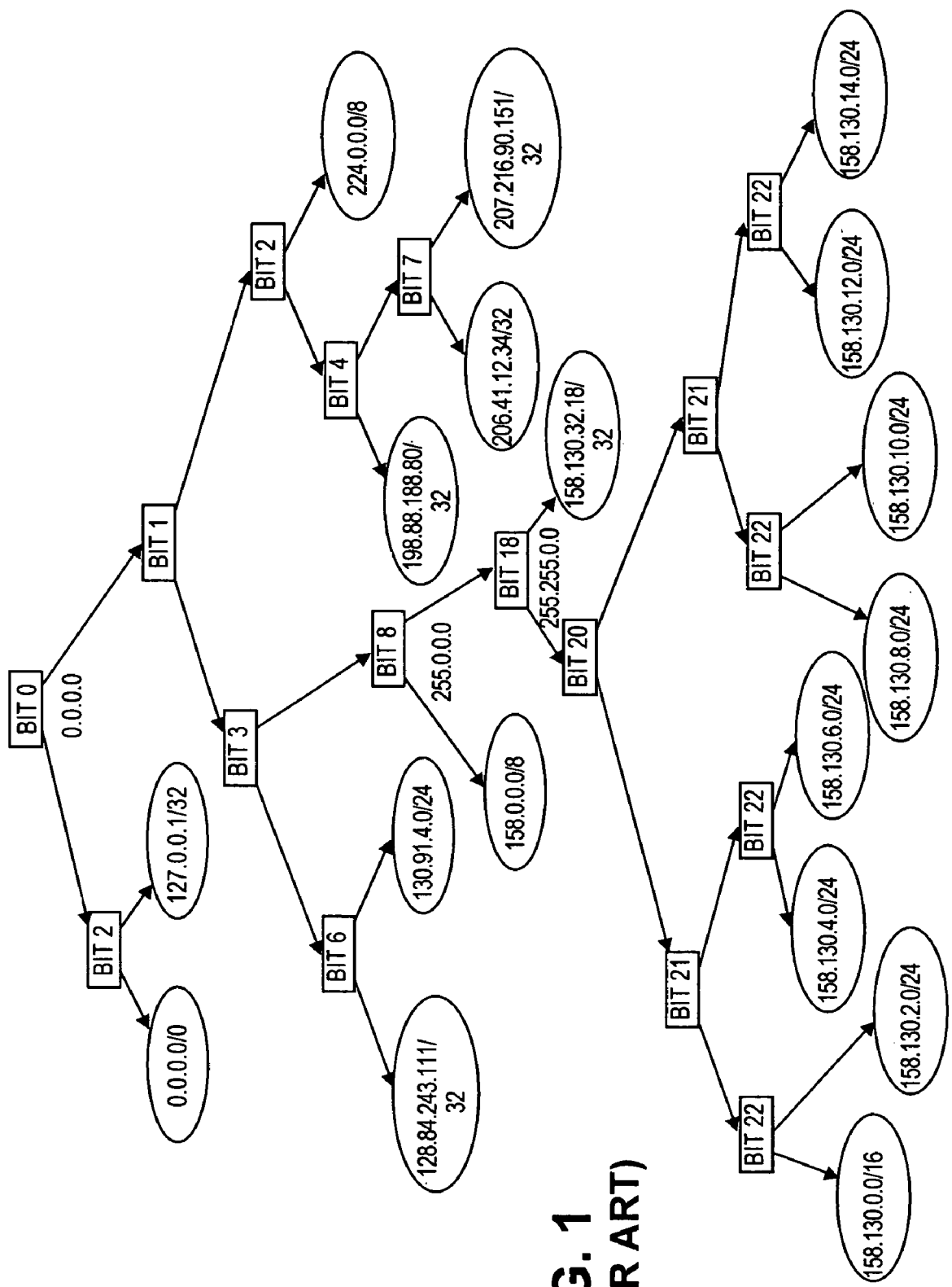
FIG. 1 is an illustration of an example routing table implemented as a tree data structure.

FIG. 1 is an illustration of a traditional routing table implemented as a Patricia Tree. A search for a match to address 148.225.3.61 (10010100.11100001.00000011.00111101) using the Patricia Tree algorithm provides an example of backtracking. For purposes of this example, the internal nodes "bit 18," "bit 8," and "bit 0" are each marked with a mask.

To implement a search, the algorithm begins at a root node of the Patricia Tree. A root node can be an internal node or an external node. If the root node is an internal node, the algorithm examines in the destination address a bit occupying the bit position specified by the internal node. If the bit examined is a 0, the algorithm proceeds to the left child node of the root node, and if the bit examined is a 1, the algorithm proceeds to the right child node of the root node. When the algorithm reaches an external node, the algorithm determines whether there is a match between the packet's destination address and the external node's prefix. A prefix match exists when the bits of the packet's destination address match the bits of the external node's prefix up to the mask length of the external node's prefix. If there is a prefix match, the router forwards the packet to the next node indicated in the RTE represented by the prefix. However, if there is no match at the external node, the algorithm backtracks, applies a mask, and repeats the search.

In this example, the root node in a search for a match to 148.225.3.61 is the internal node "bit 0." The algorithm examines the bit in bit position 0 of the packet's destination address, where the first bit from the left is bit 0, the next bit is bit 1, etc. Because bit 0 is a "1," the algorithm proceeds to the right child node of the bit 0 node, to the internal node "bit 1." The algorithm examines the bit in bit position 1 of the packet's destination address, and because that bit is a "0," the algorithm proceeds to the left child node, to the internal node "bit 3." The algorithm examines the bit in bit position 3, and because that bit is a "1," the algorithm proceeds to the right child node, to the internal node "bit 8." Examining the bits specified in the internal nodes until reaching an external node, the algorithm arrives at the external node with the prefix 158.130.2.0/24 (10011110.10000010.00000010.0000000), whose mask length is 24.

The first 24 bits of 148.225.3.61 do not match the first 24 bits of 158.130.2.0, and thus matching fails. Because matching fails, the algorithm backtracks to the first internal node that is marked with a mask, i.e., the internal node "bit 18," applies the mask to the address, and starts the search again at the internal node bit 18. In this case, the mask is 255.255.0.0 (11111111.11111111.00000000.00000000). Applying the mask to 148.225.3.61 (10010100.11100001.00000011.00111101) results in 148.225.0.0 (10010100.11100001.00000000.00000000), because the 1s in the mask indicate that the first 16 bits remain unchanged, while the 0s indicate that the final 16 bits are changed to 0s.

After application of the mask, the algorithm examines the bit in bit position 18, and because that bit was changed to 0 after applying the mask, the algorithm proceeds to the left child node, to the internal node "bit 20," and examines the bit in bit position 20. Because the bit in bit position 20 was changed to 0, the algorithm proceeds to the left child node, to the internal node "bit 21." The algorithm proceeds to the left child node because bit 21 was changed to 0, to the internal node "bit 22." Because the bit in bit position 22 was changed to 0, the algorithm proceeds to the left child node, and arrives at the external node with the prefix 158.130.0.0/16 (10011110.10000010.00000000.0000000), whose mask length is 16.

The first 16 bits of 148.225.0.0 do not match the first 16 bits of 158.130.0.0. Because matching again fails, the algorithm backtracks to the next internal node that is marked with a mask, i.e., the internal node "bit 8," applies the mask, and starts the search again at internal node "bit 8." In this case, the mask is 255.0.0.0 (11111111.00000000.000000000.00000000), and applying this mask to 148.225.3.61 results in 148.0.0.0 (10010100.00000000.00000000.00000000). After application of the mask, the algorithm examines the bit in bit position 8, and because that bit was changed to 0 after applying the mask, the algorithm proceeds to the left, to the external node with the prefix 158.0.0.0/8 (10011110.00000000.00000000.0000000), whose mask length is 8.

The first 8 bits of 148.0.0.0 do not match the first 8 bits of 158.0.0.0, and thus matching fails. Because matching again fails, the algorithm backtracks to the next internal node that is marked with a mask, i.e., the internal node "bit 0," applies the mask, and starts the search again at internal node bit 0. In this case, the mask is 0.0.0.0, and applying this new mask to 148.225.3.61 results in 0.0.0.0 (00000000. 00000000.00000000.00000000).

After application of the mask, the algorithm examines the bit in bit position 0. Because that bit was changed to 0 after applying the mask, the algorithm proceeds to the left, to the internal node "bit 2." Because the bit in bit position 2 was changed to 0 after applying the mask, the algorithm proceeds to the left, to the external node with the prefix 0.0.0.0/0 (00000000.00000000.00000000.0000000). The prefix 0.0.0.0/0 is commonly referred to as a default route. When a default route exists, it matches all IP destination addresses, and may be a best match if no other prefix matches the destination address. Thus, in this example the algorithm locates the prefix 0.0.0.0/0 as a best match after multiple backtracks and searches. As stated previously, this backtracking and re-searching increases routing table look-up time, and thus slows router performance.

Figure 2:
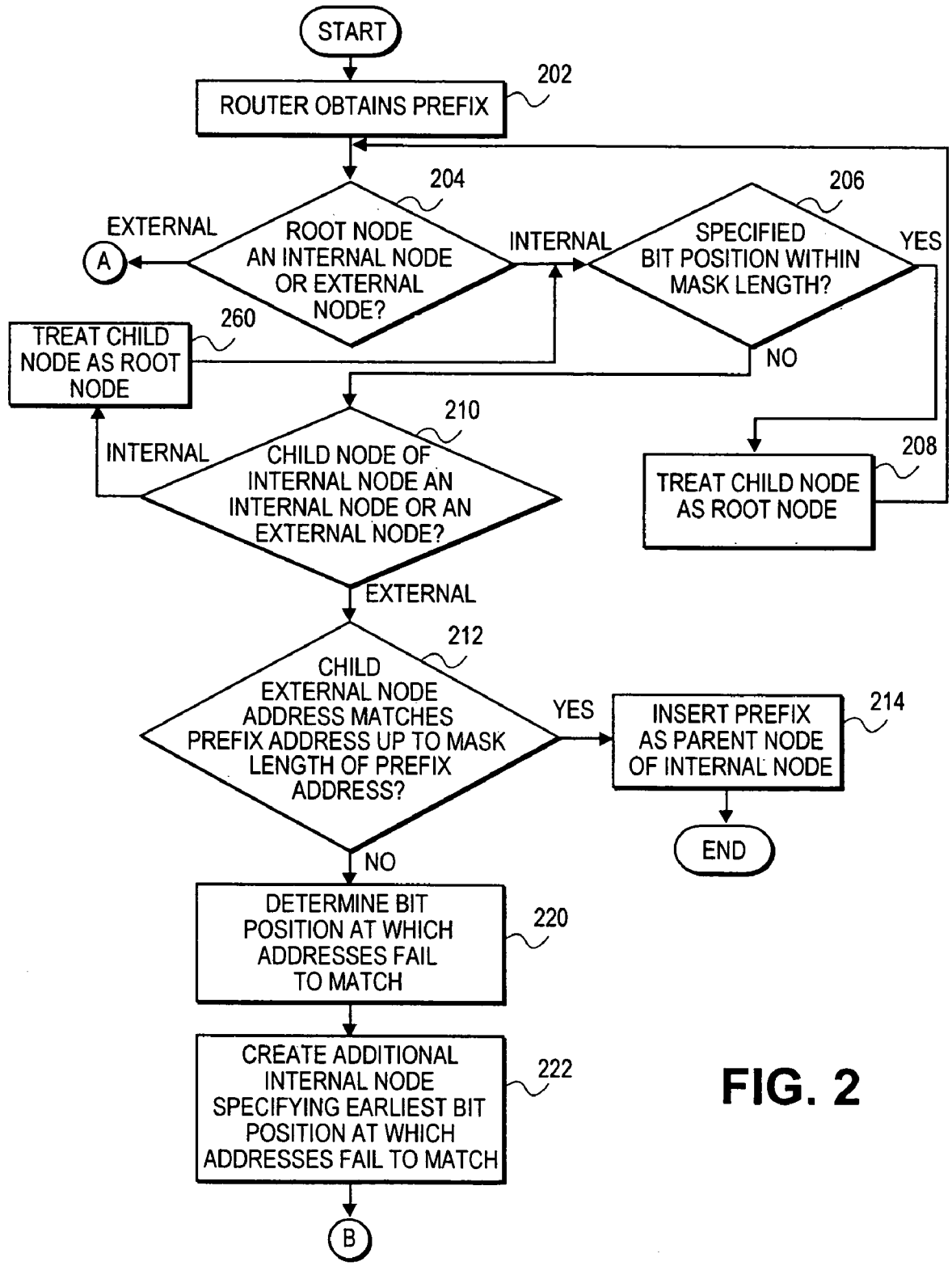
FIG. 2, FIG. 3 and FIG. 4 are a flow diagram illustrating an example embodiment of a method of generating a routing table implemented as a tree data structure.
Figure 3:
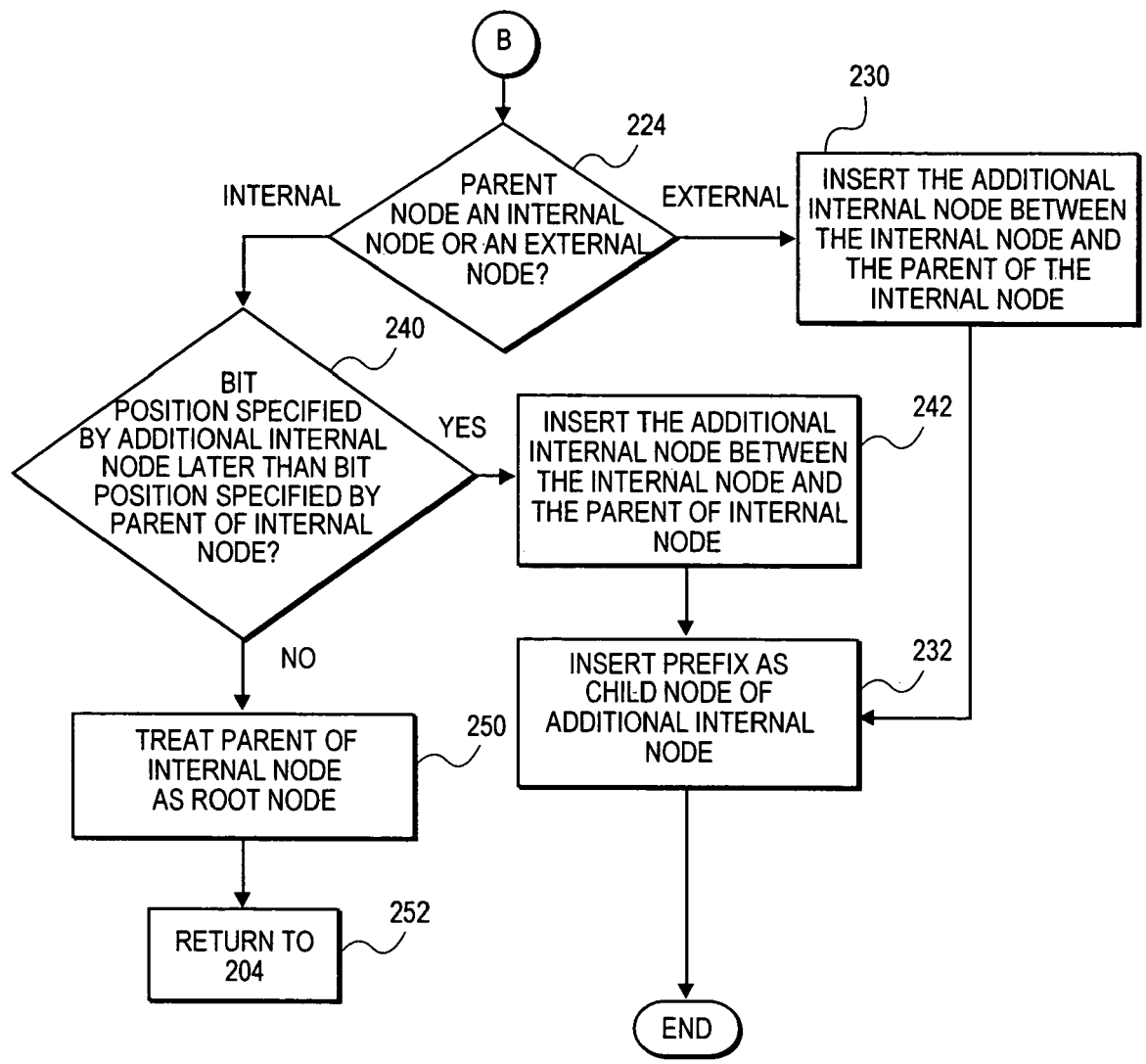
Figure 4:
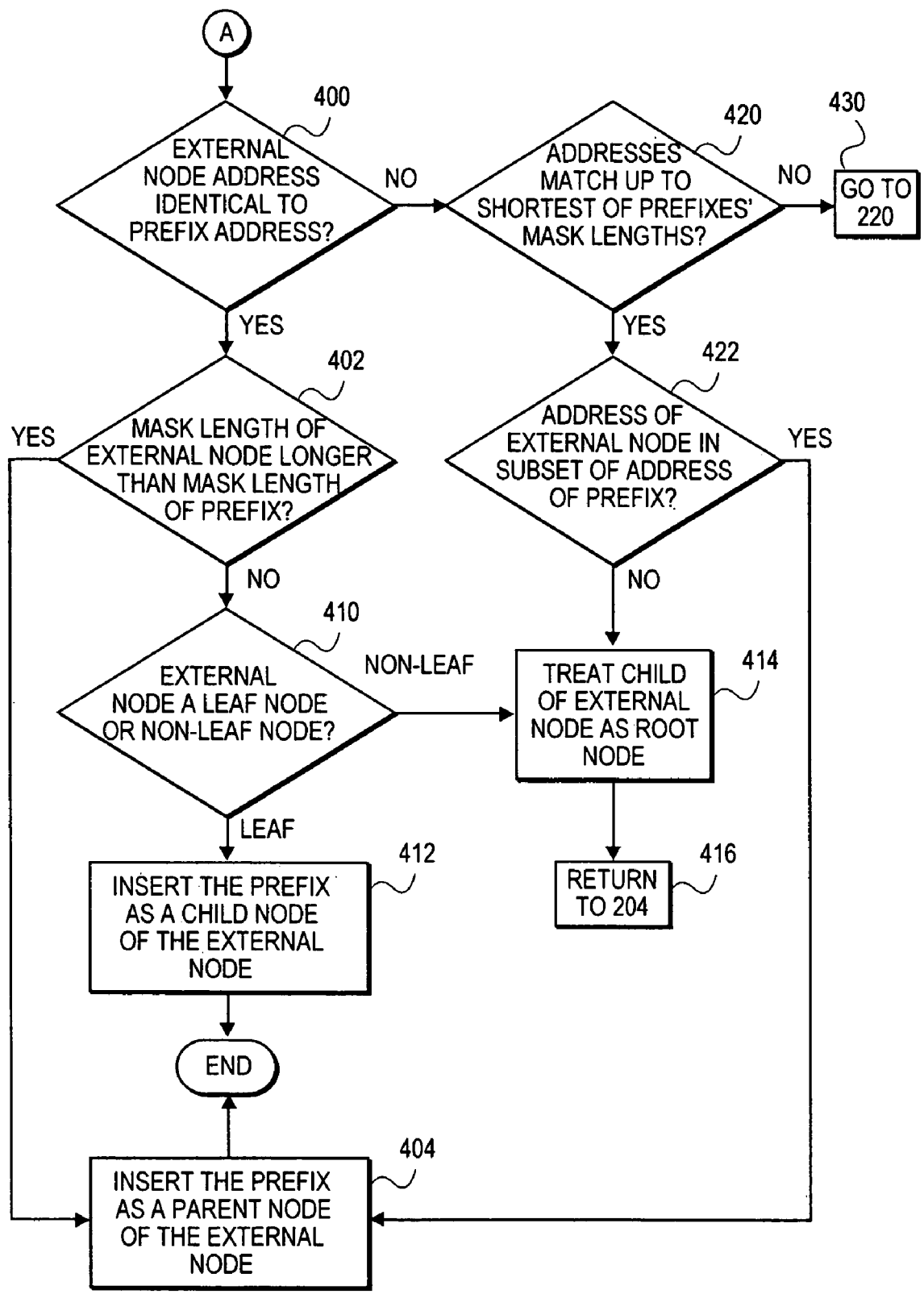

FIG. 2, FIG. 3, and FIG. 4 are a flow diagram illustrating an example embodiment of a method of generating a routing table implemented as a tree data structure. The tree data structure includes non-leaf external nodes linked, indirectly via another node or directly, as parent nodes of other external nodes having prefixes whose leading bits match the parent node's prefix up to the mask length of the parent node. In other words, for a given non-leaf external node, any external node in the subtree rooted at the non-leaf external node, matches the non-leaf external node. Accordingly, in the tree data structure generated in accordance with the example embodiment of the method illustrated in FIG. 2, FIG. 3 and FIG. 4, an external node may be a leaf node, meaning it has no child nodes, or a non-leaf node, meaning it has at least one child node. As explained in more detail below in connection with FIG. 7, such a tree data structure can eliminate backtracking, because, in part, a determination as to whether there is a match occurs at an external node that is not a leaf node.

For purposes of illustration and ease of explanation, method 200 is described in terms of generating a routing table implemented as a tree data structure, such as a Patricia Tree or other tree data structure. However, method 200 may be used to generate a routing table implemented as other than a tree data structure, e.g., a routing table implemented as a lateral data structure. In addition, method 200 may be used to generate a new tree data structure, or to restructure an existing traditional tree data structure, e.g., a Patricia Tree.

At 202, a router obtains a prefix associated with a network device, where the prefix is represented by an address of the network device and a mask length. The router itself may obtain the prefix, or receive the prefix from another router. When a new node is added to a network, or an existing node disappears, e.g., due to a broken connection to a node or because a node has been removed from the network, the router updates its routing table. A routing protocol application, e.g., open shortest path first (OSPF), routing information protocol (RIP) or border gateway protocol (BGP), is an application running on a router that allows the router to detect a change in a route, or receive route information from other routers in the network. See, e.g., (IETF Network Working Group, RFC 2328, "OSPF Version 2," April 1998; IETF Network Working Group, RFC 1775, "A Border Gateway Protocol 4 (BGP-4)," March 1995; IETF Network Working Group, RFC 2453 "RIP Version 2," November 1998. For purposes of presentation and ease of explanation, method 200 is described in connection with a router. However, the invention is not limited to use with a router, e.g., the algorithm used in connection with a switch, or used to generate a routing table data structure in a remote location accessible via a network.

At 204, an algorithm for generating a routing table implemented as a tree data structure determines whether a root node of the tree data structure is an internal node or an external node. If the root node is an internal node, at 206 the algorithm determines whether the bit position identified by the internal node is within the mask length of the prefix. If the specified bit position is within the mask length of the prefix, at 208 the algorithm treats the child node of the internal node as the root node, and returns to 204.

However, if at 206 the bit specified by the internal node is not within the mask length of the prefix, at 210 the algorithm determines whether a child node of the internal node is an external node or an internal node. If the child node of the internal node is an internal node, at 260, the algorithm treats as the root node the child node of the internal node, and returns to 206.

However, if at 210 the algorithm determines that the child node of the internal node is an external node, at 212 the algorithm determines whether the address of the child node matches the address of the prefix up to the mask length of the prefix. If the address of the child node matches the address of the prefix up to the mask length of the prefix, at 214, the algorithm inserts the prefix as a parent node of the internal node.

Figure 8:
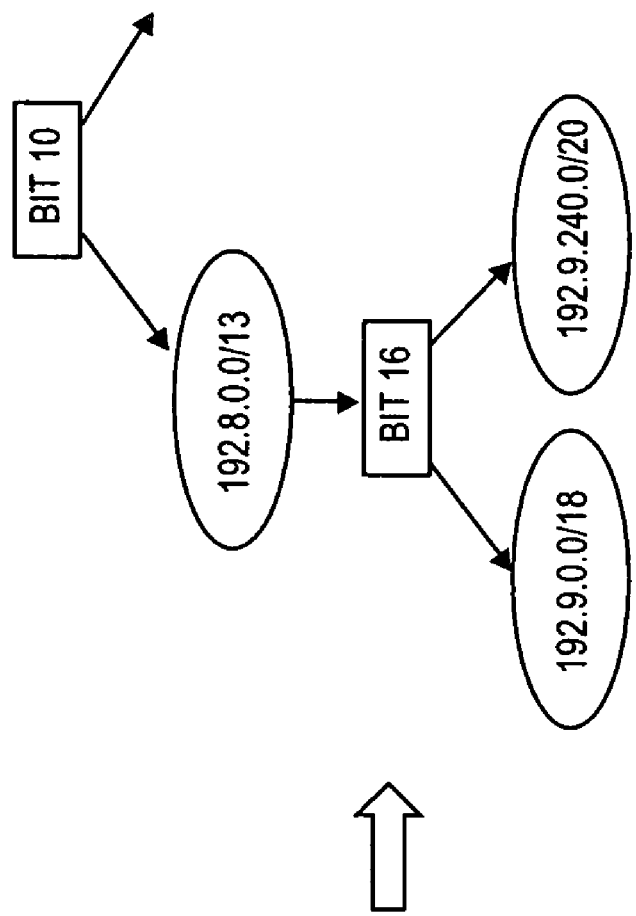
FIG. 8 is an illustration of inserting a prefix in tree data structure according to an embodiment of the invention.
Figure 8:
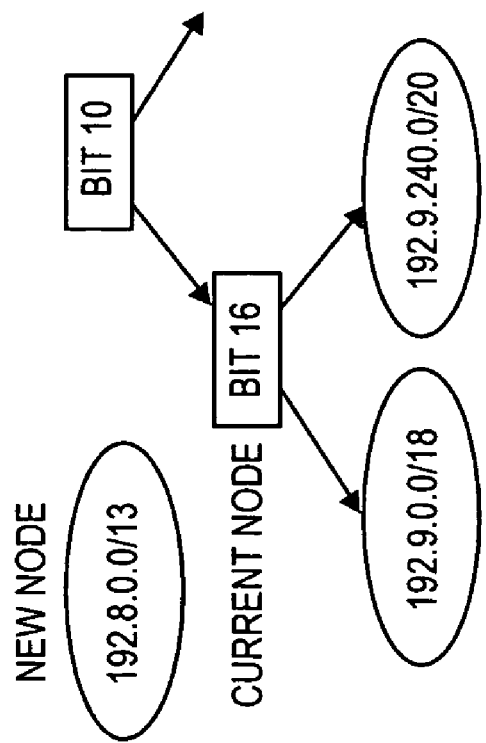

For example, in FIG. 8, the internal node "bit 16" is the current node, and 192.8.0.0/13 (11000000. 00001000.00000000.00000000) is a prefix to be inserted into the tree data structure illustrated in FIG. 8. The root node is an internal node specifying bit position 16. Because the prefix has a mask length of 13, while the bit position specified by the root node is 16, the specified bit position is beyond the mask length of the prefix. As a result, the algorithm examines the child nodes of the current node, finds external nodes with the prefixes 192.9.0.0/18 (11000000.00001001. 00000000.00000000) and 192.9.240.0/20 (11000000. 00001001.11100000.00000000), and determines whether the address of the prefix matches the addresses of the child nodes up to the mask length (13) of the prefix. Because the address of the prefix matches the addresses of the child nodes up to the mask length of the prefix, the prefix is inserted as a parent node of the root node.

Returning to 212, if the address of the child node of the internal node fails to match the address of the prefix up to the mask length of the prefix, at 220, the algorithm determines an earliest bit position at which the prefix address fails to match the child node address. At 222, the algorithm creates an additional internal node to identify an additional specified bit position, wherein the additional specified bit position identifies the earliest bit position at which the address of the child node fails to match the address of the prefix.

At 224, the algorithm determines whether the parent node of the internal node is an external node or an internal node. If the parent node of the internal node is an external node, at 230 the algorithm inserts the additional internal node between the parent node of the internal node and the internal node. At 232, the algorithm inserts the prefix as a child node of the additional internal node. However, if at 224 the parent node of the internal node is an internal node, at 240, the algorithm determines whether the bit position specified by the additional internal node is a later bit position than the bit position specified by the parent node of the internal node. If at 240 the bit position specified by the additional internal node is not a later bit position than the bit position specified by the parent node of the internal node, at 250 the algorithm treats the parent node of the internal node as the root node and at 252 returns to 204.

Figure 9:
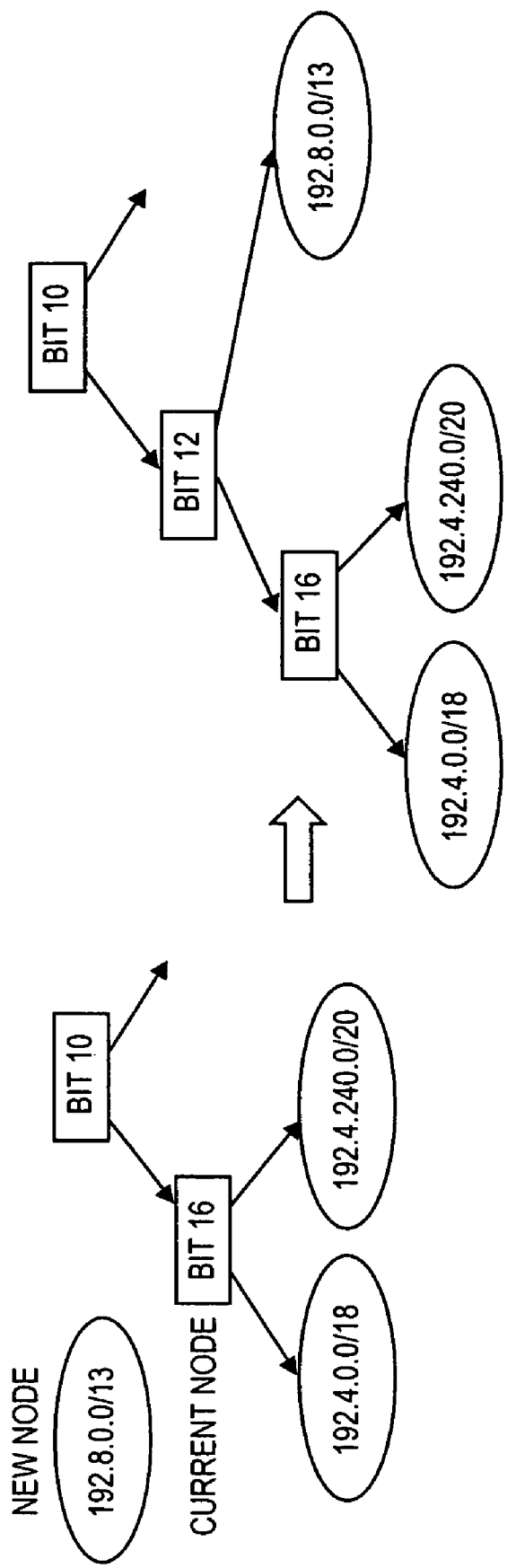
FIG. 9 is another illustration of inserting a prefix in a tree data structure according to an embodiment of the invention.

However, if at 240 the bit position specified by the additional internal node is a later bit position than the bit position specified by the parent node of the internal node, at 242 the algorithm inserts the additional internal node between the internal node and the parent node of the internal node, and at 232 inserts the prefix as a child node of the additional internal node. For example, in FIG. 9, the internal node marked "bit 16" is the root node, and 192.8.0.0/13 (11000000.00001000.00000000.00000000) is a prefix to be added to the tree data structure illustrated in FIG. 9. The bit position (16) specified by the internal node is not within the mask length (13) of the prefix. Thus, the algorithm examines the child nodes of the internal node, and determines that the child nodes are external nodes.

The algorithm determines that the addresses of the child nodes of the internal node and the address of the prefix do not match up to the mask length of the prefix: the mask length of the prefix is 13, and the first 13 bits of 192.8.0.0 (see above) do not match the first 13 bits of 192.4.0.0 and 192.4.240.0 (11000000.00000100.00000000.00000000 and 11000000.00000100.11100000.00000000, respectively). Thus, the algorithm determines the earliest bit position at which the addresses fail to match, in this case bit position 12, and creates an internal node specifying bit position 12.

The algorithm determines that the parent node of the internal node is parent internal node, i.e., the internal node specifying bit 10. The algorithm determines that the specified bit position of the new internal node (12) is later than the specified bit position (10) of the parent internal node of the internal node. Thus, the algorithm inserts the new internal node between the parent internal node and the internal node, and the new prefix as a child node of the new internal node.

Returning to 204, if the algorithm determines that the root node is an external node, at 400 the algorithm determines whether the address of the prefix is identical to the address of the external node. If the address of the prefix is identical to the address of the external node, at 402 the algorithm determines whether the mask length of the prefix is longer than the mask length of the external node. If the mask length of the prefix is longer than the mask length of the external node, at 404, the algorithm inserts the prefix as a parent node of the external node.

Conversely, if at 402 the mask length of the prefix is not longer than the mask length of the external node, at 410 the algorithm determines whether the external node is a leaf node or non-leaf node. If the external node is a leaf node, at 412 the algorithm inserts the prefix as a child node of the external node. However, if at 410 the algorithm determines that the external node is a non-leaf node, at 414 the algorithm treats the child node of the external node as the root node, and at 416 returns to 204.

Returning to 400, if the algorithm determines that the address of the prefix is not identical to the address of the external node, at 420, the algorithm determines whether the addresses match up to the shorter of the prefixes' mask lengths. If the addresses fail to match up to the shorter of the prefixes' mask lengths, at 430 the algorithm goes to 220.

However, if at 420 the addresses match up to the shorter of the prefixes' mask lengths, at 422 the algorithm determines whether the address of the external node is a subset of the address of the prefix. For example, in the prefixes 158.4.22.0/24 and 158.4.22.5/32, the shortest mask length is 24, and the first 24 bits of each address match. In addition, 158.4.22.5/32 is a subset of 158.4.22.0/24, and is commonly referred to as being more specific than 158.4.22.0/24. Conversely, 158.4.22.0/24 is a superset of 158.4.22.5/32, and is commonly referred to as being less specific than 158.4.22.5/32.

If the address of the external node is not a subset of the address of the prefix, at 414 the algorithm treats the child node of the external node as the root node, and at 416 returns to 204. However, if at 422 the address of the external node is a subset of the address of the prefix, at 404 the algorithm inserts the prefix as a parent node of the external node.

Figure 5:
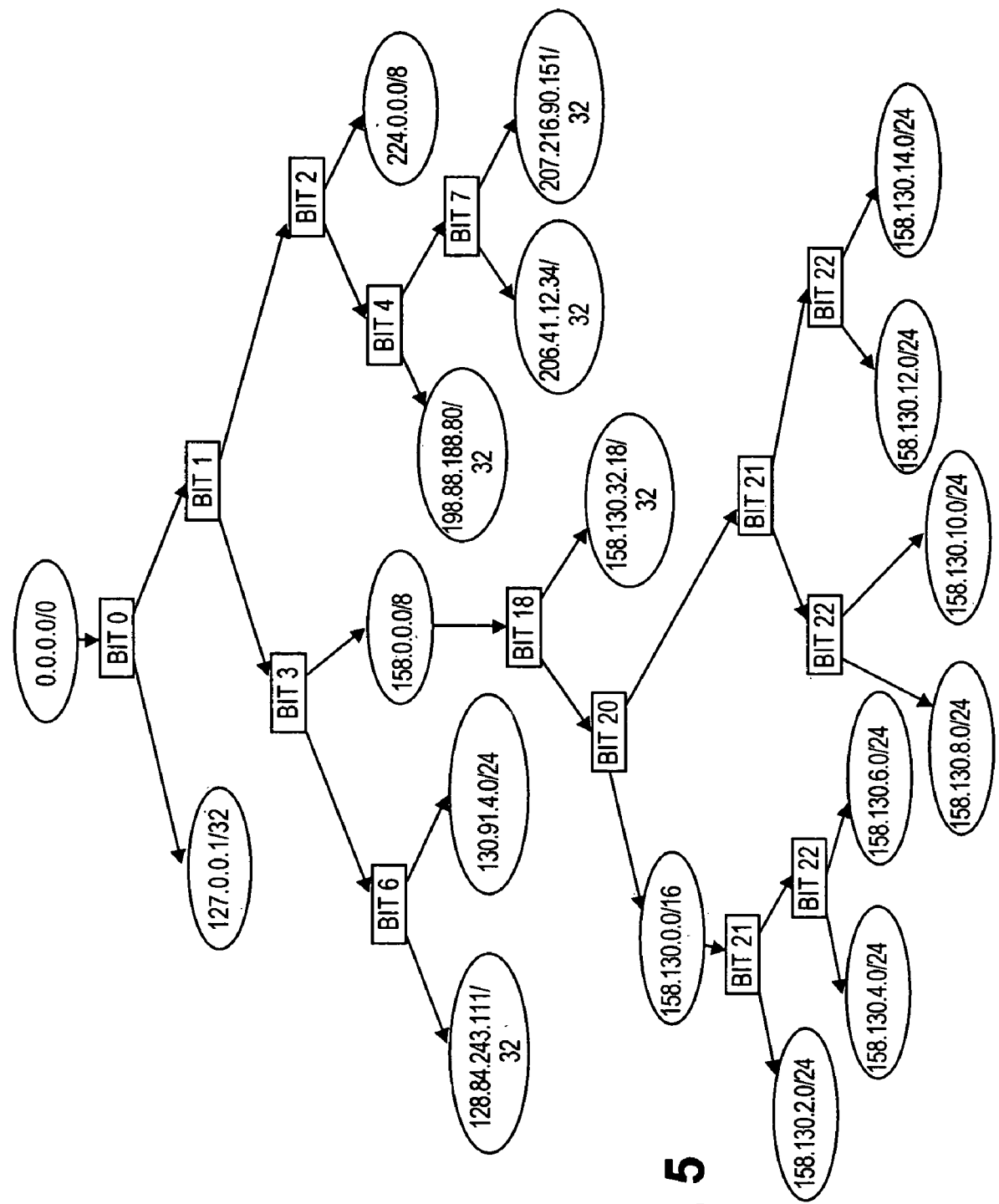
FIG. 5 is an illustration of an example routing table implemented as a tree data structure according to an embodiment of the invention.

FIG. 5 is an illustration of an example routing table implemented as a tree data structure according to an embodiment of the invention. The tree data structure of FIG. 5 is the tree data structure of FIG. 1, restructured according to method 200. For purposes of illustration and ease of explanation, method 200 has been described in terms of separate external nodes and internal nodes. However, an external node and an internal node may be combined into a single node.

Figure 6:
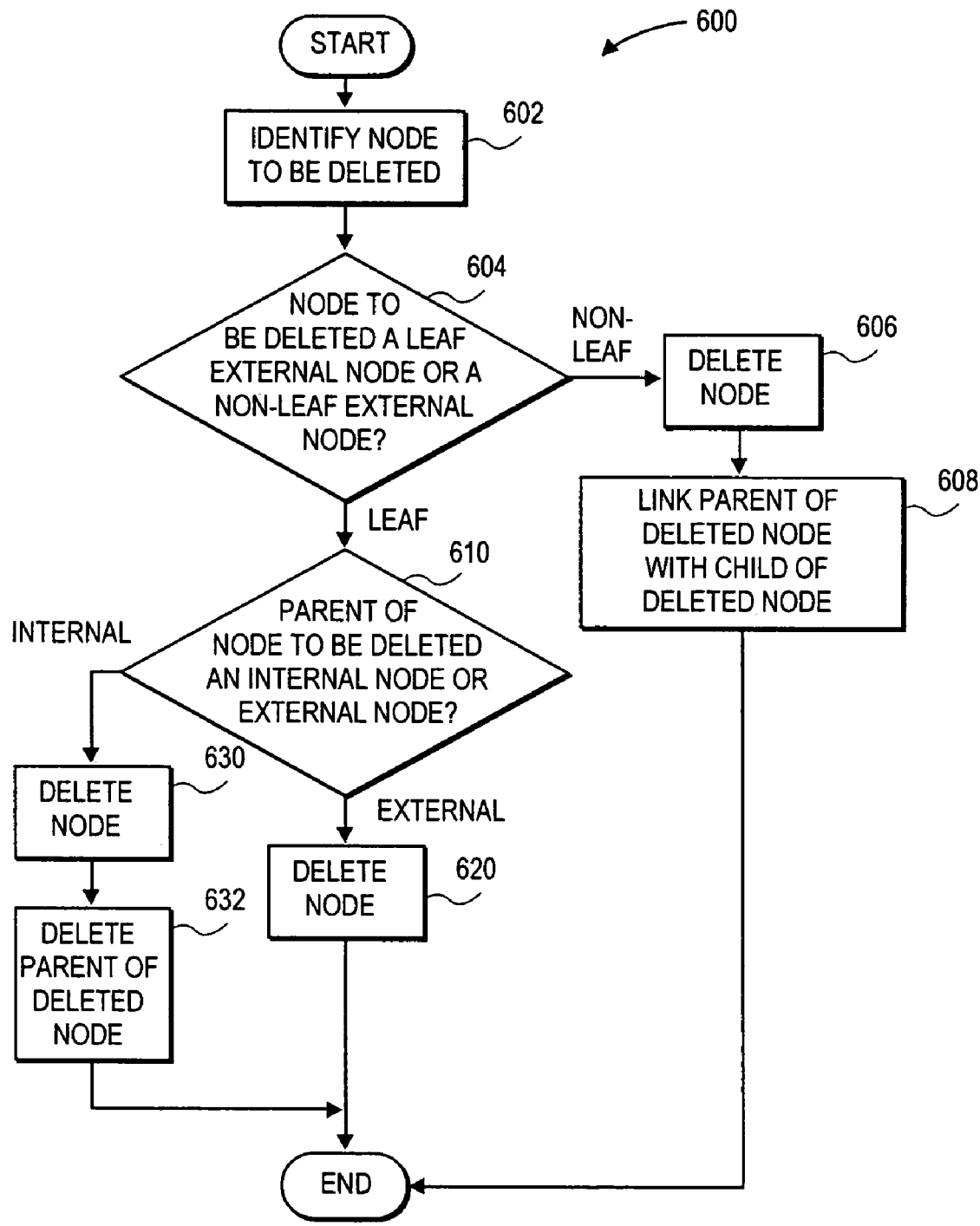
FIG. 6 is a flow diagram illustrating an example embodiment of a method of deleting a prefix from a routing table implemented as a tree data structure.

FIG. 6 is a flow diagram illustrating an example embodiment of a method of deleting a prefix from a routing table implemented as a tree data structure. At 602 of method 600, a node of a prefix to be deleted is identified. At 604, an algorithm for deleting prefixes determines whether the node to be deleted is a leaf external node or a non-leaf external node. If the node to be deleted is a non-leaf external node, at 606 the algorithm deletes the node to be deleted and at 608 links the parent node and the child node(s) of the non-leaf external node.

However, if the node to be deleted is a leaf external node, at 610 the algorithm determines whether the parent node of the leaf node is an internal node or an external node. If the parent node is an external node, at 620, the algorithm deletes the leaf node. However, if the parent node is an internal node, at 630 the algorithm deletes the leaf node and at 632 deletes the parent of the leaf node.

Figure 7:
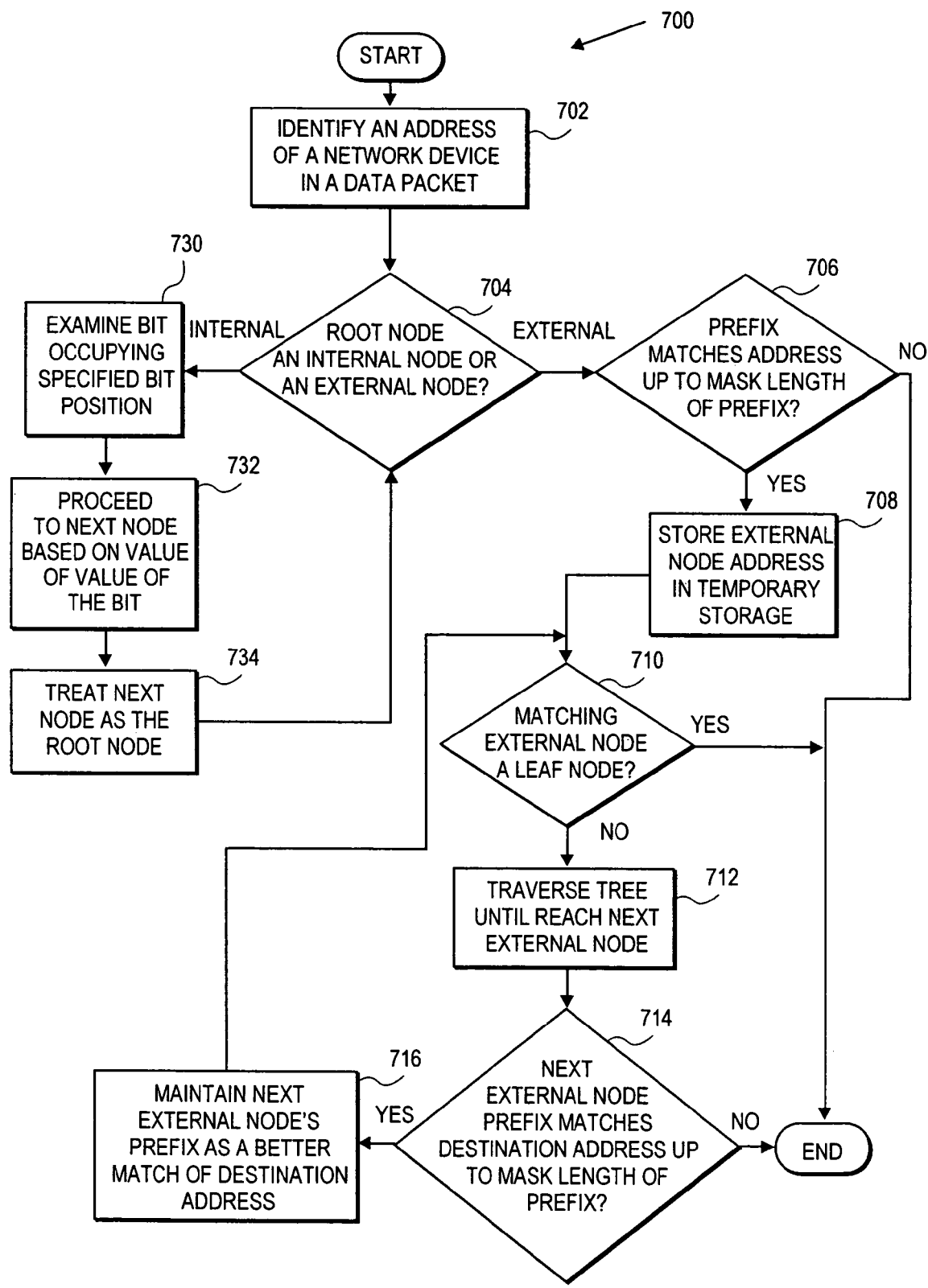
FIG. 7 is a flow diagram illustrating an example embodiment of a method of searching a routing table implemented as a tree data structure.

FIG. 7 is a flow diagram illustrating an example embodiment of a method of searching a routing table implemented as a tree data structure. At 702 of method 700, an algorithm identifies in a data packet an address of a network device. In one embodiment, the address is a destination address. However, method 700 is not limited to a destination address, e.g., the address may be a source address. In one embodiment, the address is an IPv4 address. However, method 700 is not limited to an IPv4 address, e.g., method 700 may be used with an IPv6 address or other type of address.

At 704, the algorithm determines whether a root node of the tree data structure is an internal node or an external node. If the root node is an internal node, at 730 the algorithm examines the bit in the destination address that occupies the bit position specified by the internal node. At 732, the algorithm proceeds to a next node, based on the value of the bit examined. For example, the algorithm proceeds to a certain node if the value of the examined bit is 0, and proceeds to a different node if the value of the examined bit is 1. At 734, the algorithm treats the node to which the algorithm proceeded at 732 as the root node, and returns to 704. For purposes of illustration and ease of explanation, method 700 is described in terms of bits and bit positions. However, method 700 is not limited to bits and bit positions, proceeding to a next node based on only two possible values, or to proceeding to a certain node for a 0 and a different node for a 1 if two values are used. For example, method 700 may be used with a tree data structure having internal nodes that cause the algorithm to process to one of 26 possible next nodes depending on a letter identified by the internal node.

However, if at 704 the root node is an external node, at 706, the algorithm determines whether the leading bits of the prefix of the external node match the leading bits of the destination address up to the mask length of the prefix. In one embodiment, the leading bits are determined starting at the left-most bit. However, the leading bits may be determined starting at the right-most bit.

If the leading bits of the destination address do not match the leading bits of the prefix of the external node up to the mask length of the prefix, method 700 ends. Alternatively, if at 706 the leading bits of the destination address match the leading bits of the prefix of the external node up to the mask length of the prefix, at 708, the algorithm stores the prefix of the external node in a temporary storage location, such as a buffer. In another embodiment, rather than storing the prefix of the external node in a temporary location, a pointer points to the prefix of the external node.

At 710, the algorithm determines whether the external node having the matching address is a leaf external node. If the external node is a leaf external node, the stored prefix is the longest prefix match. However, if the external node is not a leaf node, at 712 the algorithm traverses the tree data structure (using 730-734 if reaching any internal nodes), until reaching the next external node. In one embodiment, the next external node is linked below the external node whose prefix is in temporary storage, and the prefix of the next external node has a mask length that is longer than the mask length of the stored prefix. The next external node may be linked either directly below the external node of the stored prefix, as a child node of that external node, or indirectly below the external node of the stored prefix, by linking the next external node with at least one other node that is between the external node of the stored first prefix and the next external node.

At 714, the algorithm determines whether the prefix of the next external node matches the destination address up to the mask length of the prefix. If the algorithm determines that the next external node's prefix does not match the destination address up to the mask length of the prefix, then the stored prefix is the longest prefix match.

Alternatively, if at 712, the next external node's prefix matches the destination address up to the mask length of the prefix, at 716 the algorithm maintains the prefix of the next external node as a better match of the destination address. In one embodiment, the next external node prefix is stored in the temporary storage location in place of the stored prefix. Alternatively, a pointer points to the location of the most recently stored prefix. The algorithm returns to 710, until the algorithm reaches either a leaf external node, or a non-leaf external node whose prefix fails to match the destination address up to the mask length of the prefix.

The following is an example search in the tree data structure of FIG. 5 using method 700. To find a longest prefix match for 158.130.1.5 (10011110.10000010.00000001.00000101), the algorithm starts at the root node with the prefix 0.0.0.0/0. There is a match because 0.0.0.0/0 is a default route, as explained previously, and the algorithm stores 0.0.0.0/0 in a buffer.

The node with the prefix 0.0.0.0/0 is not a leaf external node, and thus the algorithm proceeds to the next node, i.e., the internal node "bit 0." In this example, because bit 0 (the first bit from the left in this example) in 158.130.1.5 is a 1, the algorithm proceeds to the right (whereas had bit 0 been a 0, the algorithm would proceed to the left in this example), to the internal node "bit 1." The algorithm examines bit 1, which is a 0 and thus leads to examining bit 3, which causes the algorithm to arrive at the external node with the prefix 158.0.0.0/8. The mask length of the prefix is 8. The first 8 bits of 158.0.0.0 match the first 8 bits of 158.130.1.5, which means there is a match, and thus 158.0.0.0/8 replaces 0.0.0.0/0 in the buffer.

The node with the prefix 158.0.0.0/8 is not a leaf external node, thus the algorithm traverses the tree data structure as explained above and arrives at the external node with the prefix 158.130.0.0/16. The mask length of the prefix is 16. The first 16 bits of 158.130.0.0 match the first 16 bits of 158.130.1.5. Thus, 158.130.0.0/16 is a better match and replaces 158.0.0.0/8 in the buffer. Continuing in the tree data structure, the algorithm arrives at the external node with the prefix 158.130.2.0/24, and the first 24 bits of 158.130.2.0 do not match the first 24 bits of 158.130.1.5. Thus, the currently stored prefix, 158.130.0.0/16, is the longest prefix match of 158.130.1.5.

The previous example search in connection with FIG. 1 involved a search for the address 148.225.3.61. Searching for the same address in the tree data structure of FIG. 5, the root node has the prefix 0.0.0.0/0, which is a match as explained earlier. The algorithm stores that prefix, and proceeds to examine bits 0, 1 and 3 to reach the external node with the prefix 158.0.0.0/8. The mask length of the prefix is 8, and the first 8 bits of 148.225.3.61 do not match the first 8 bits of 158.0.0.0. Therefore, 0.0.0.0/0 is the longest prefix match. As this example illustrates, generating a routing table as a tree data structure in accordance with method 200 eliminates backtracking and thereby improves router performance by reducing routing table look-up time.

FIGS. 2-4 and 6-7 describe example embodiments of the invention in terms of a method. However, one should also understand it to represent a machine-accessible medium having recorded, encoded or otherwise represented thereon instructions, routines, operations, control codes, or the like, that when executed by or otherwise utilized by an electronic system, cause the electronic system to perform the methods as described above or other embodiments thereof that are within the scope of this disclosure.

Figure 10:
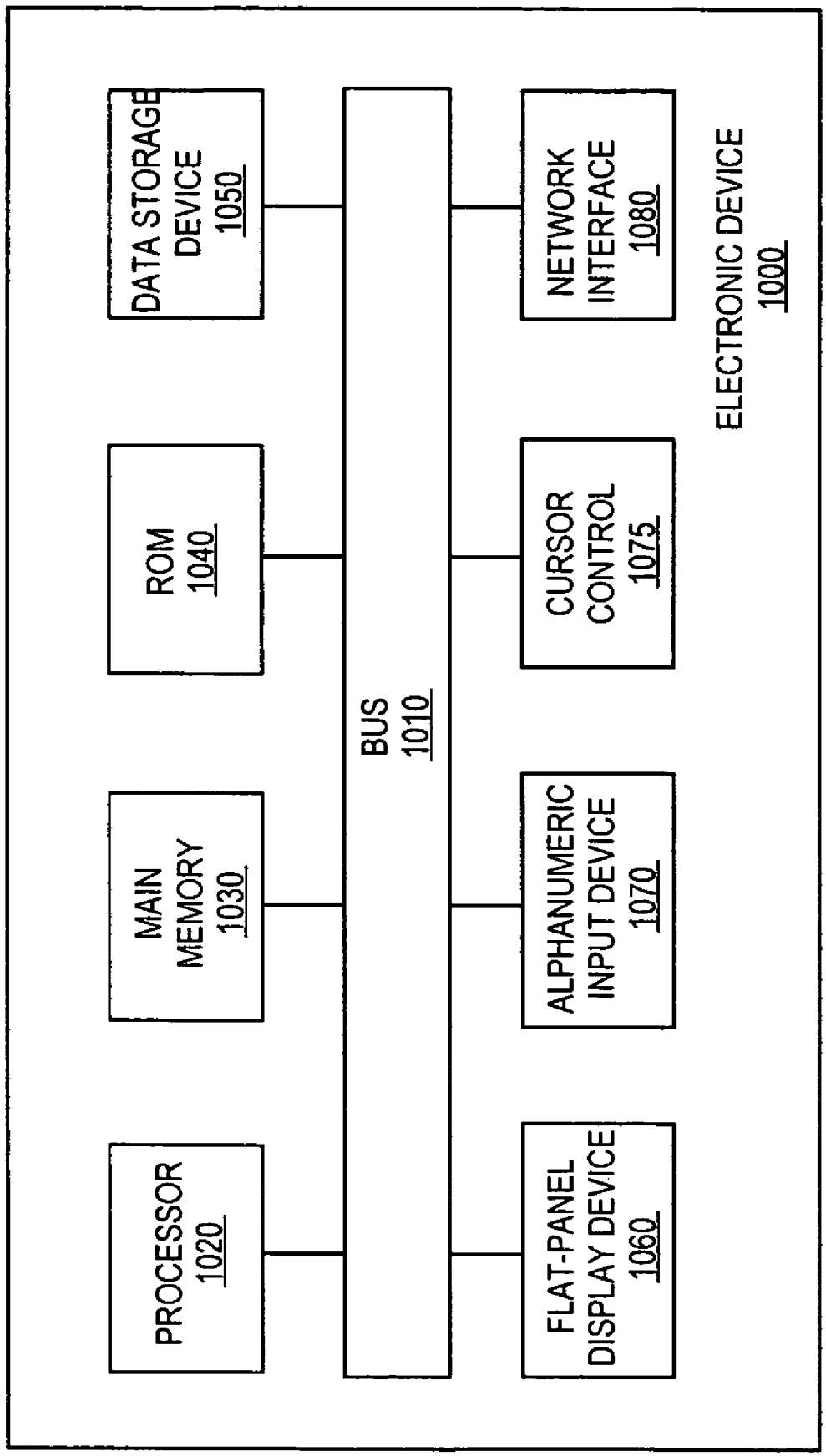
FIG. 10 is a block diagram illustrating one embodiment of an electronic system.

FIG. 10 is a block diagram of one embodiment of an electronic system. The electronic system is intended to represent a range of electronic systems, including, for example, a personal computer, a personal digital assistant (PDA), a laptop or palmtop computer, a cellular phone, a computer system, a network access device, etc. Other electronic systems can include more, fewer and/or different components. The methods of FIG. 3-FIG. 7 can be implemented as sequences of instructions executed by the electronic system. The sequences of instructions can be stored by the electronic system, or the instructions can be received by the electronic system (e.g., via a network connection). The electronic system can be coupled to a wired or wireless network.

Electronic system 1000 includes a bus 1010 or other communication device to communicate information, and processor 1020 coupled to bus 1010 to process information. While electronic system 1000 is illustrated with a single processor, electronic system 1000 can include multiple processors and/or co-processors.

Electronic system 1000 further includes random access memory (RAM) or other dynamic storage device 1030 (referred to as memory), coupled to bus 1010 to store information and instructions to be executed by processor 1020. Memory 1030 also can be used to store temporary variables or other intermediate information while processor 1020 is executing instructions. Electronic system 1000 also includes read-only memory (ROM) and/or other static storage device 1040 coupled to bus 1010 to store static information and instructions for processor 1020. In addition, data storage device 1050 is coupled to bus 1010 to store information and instructions. Data storage device 1050 may comprise a magnetic disk (e.g., a hard disk) or optical disc (e.g., a CD-ROM) and corresponding drive.

Electronic system 1000 may further comprise a display device 1060, such as a cathode ray tube (CRT) or liquid crystal display (LCD), to display information to a user. Alphanumeric input device 1070, including alphanumeric and other keys, is typically coupled to bus 1010 to communicate information and command selections to processor 1020. Another type of user input device is cursor control 1075, such as a mouse, a trackball, or cursor direction keys to communicate direction information and command selections to processor 1020 and to control cursor movement on flat-panel display device 1060. Electronic system 1000 further includes network interface 1080 to provide access to a network, such as a local area network or wide area network.

Instructions are provided to memory from a machine-accessible medium, or an external storage device accessible via a remote connection (e.g., over a network via network interface 1080) providing access to one or more electronically-accessible media, etc. A machine-accessible medium includes any mechanism that provides (i.e., stores and/or transmits) information in a form readable by a machine (e.g., a computer). For example, a machine-accessible medium includes RAM; ROM; magnetic or optical storage medium; or flash memory devices; etc.

In alternative embodiments, hard-wired circuitry can be used in place of or in combination with software instructions to implement the embodiments of the present invention. Thus, the embodiments of the present invention are not limited to any specific combination of hardware circuitry and software instructions.

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, are to be regarded in an illustrative rather than a restrictive sense.

What is claimed is:

1. A method, comprising:
    identifying in a data packet a first address of a network device;
    determining whether a first prefix in a tree data structure matches the most significant bits of the first address up to the length of a first prefix mask for the first prefix;
    maintaining the first prefix in a temporary storage location if there is a match;
    determining whether a second prefix in the tree data structure matches the most significant bits of the first address up to the length of a second prefix mask for the second prefix, and wherein the length of the prefix mask for the second prefix is longer than the length of the prefix mask for the first prefix; and
    replacing the first prefix with the second prefix in the temporary storage location as a better match of the first address, if the first address matches the second prefix up to the length of the prefix mask for the second prefix.

2. The method of claim 1, wherein identifying the first address in the data packet comprises identifying a destination address of the data packet.

3. The method of claim 1, wherein identifying the first address in the data packet comprises identifying a source address of the data packet.

4. The method of claim 1, wherein determining that the address matches a first prefix in a tree data structure up to the length of the prefix mask for the first prefix comprises determining that the first address matches a second address in a routing table up to the length of the prefix mask for the first prefix, wherein the routing table is implemented as the tree data structure.

5. The method of claim 1, wherein determining whether the address matches the second prefix in the tree data structure up to the length of the prefix mask of the second prefix, comprises determining whether the address matches the second prefix in the tree data structure up to the length of the prefix mask of the second prefix, wherein second prefix is linked below the first prefix.

6. The method of claim 1, wherein maintaining the second prefix as the better match of the first address comprises maintaining the second prefix in the temporary storage location in place of the first prefix.

7. The method of claim 1, wherein determining whether the first address matches the second prefix in the tree data structure up to the length of the prefix mask of the second prefix, comprises determining whether the first address matches the second prefix in the tree data structure up to the length of the prefix mask of the second prefix, wherein second prefix is indirectly linked below the first prefix.

8. A computer-readable medium embedded with a computer executable program including instructions comprising:
    identifying in a data packet a first address of a network device;
    determining whether a first prefix in a tree data structure matches the most significant bits of the first address up to the length of a first prefix mask for the first prefix;
    maintaining the first prefix in a temporary storage location if there is a match;
    determining whether a second prefix in the tree data structure matches the most significant bits of the first address up to the length of a second prefix mask for the second prefix, and wherein the length of the prefix mask for the second prefix is longer than the length of the prefix mask for the first prefix; and
    replacing the first prefix with the second prefix in the temporary storage location as a better match of the first address, if the first address matches the second prefix up to the length of the prefix mask for the second prefix.

9. The computer-readable medium of claim 8, identifying in the data packet the first address of the network device comprises identifying a destination address of the data packet.

10. The computer-readable of claim 8, wherein determining that the address matches a first prefix in a tree data structure up to the length of the prefix mask for the first prefix comprises determining that the first address matches a second address in a routing table up to the length of the prefix mask for the first prefix, wherein the routing table is implemented as the tree data structure.

11. The computer-readable medium of claim 8, wherein second prefix is linked below the first prefix.

12. The computer-readable medium of claim 8, wherein maintaining the second prefix as a better match of the address comprise sequences of instructions comprises:
    maintaining the second prefix in the temporary storage location in place of the first prefix.

13. The computer-readable medium of claim 8, wherein second prefix is indirectly linked below the first prefix.

* * * * *